United States Patent
Sun et al.

(10) Patent No.: US 11,074,849 B2
(45) Date of Patent: Jul. 27, 2021

(54) DISPLAY METHOD, DISPLAY DEVICE, AND DISPLAY

(71) Applicant: BOE TECHNOLOGY GROUP CO., LTD., Beijing (CN)

(72) Inventors: Gaoming Sun, Beijing (CN); Chengte Lai, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/643,442

(22) PCT Filed: Mar. 22, 2019

(86) PCT No.: PCT/CN2019/079199
§ 371 (c)(1),
(2) Date: Feb. 28, 2020

(87) PCT Pub. No.: WO2019/179512
PCT Pub. Date: Sep. 26, 2019

(65) Prior Publication Data
US 2020/0193891 A1    Jun. 18, 2020

(30) Foreign Application Priority Data

Mar. 22, 2018 (CN) .......................... 201810241822.7

(51) Int. Cl.
*G09G 3/3225* (2016.01)
*G09G 3/20* (2006.01)

(52) U.S. Cl.
CPC ......... *G09G 3/2003* (2013.01); *G09G 3/3225* (2013.01); *G09G 2310/027* (2013.01);
(Continued)

(58) Field of Classification Search
CPC ...................................................... G09G 5/363
See application file for complete search history.

(56) References Cited

U.S. PATENT DOCUMENTS

2016/0335750 A1* 11/2016 Usman ................... H04N 19/86
2017/0289444 A1* 10/2017 Han .................. H04N 5/23245
2019/0073754 A1*  3/2019 Chen ......................... G06T 5/20

FOREIGN PATENT DOCUMENTS

CN           104914580 A    9/2015
CN           105869577 A    8/2016
(Continued)

OTHER PUBLICATIONS

International Search Report and Written Opinion dated May 29, 2019, for corresponding PCT Application No. PCT/CN2019/079199.
(Continued)

Primary Examiner — Nicholas R Wilson
(74) Attorney, Agent, or Firm — Kinney & Lange, P.A.

(57) ABSTRACT

The preset disclosure provides a display method, a display device and a display. The display method includes: transmitting data to be displayed to a processing unit in an RGB format after acquiring the data to be displayed; performing contrast adjustment and brightness adjustment on the data to be displayed in the RGB format by the processing unit, and transmitting the processed data to be displayed to a conversion unit; converting the processed data to be displayed into data in an MIPI format by the conversion unit, and displaying the data to be displayed in the MIPI format.

15 Claims, 5 Drawing Sheets

(52) U.S. Cl.
CPC . *G09G 2320/0626* (2013.01); *G09G 2340/06* (2013.01); *G09G 2360/02* (2013.01)

(56) References Cited

FOREIGN PATENT DOCUMENTS

| CN | 106485687 A | 3/2017 |
| CN | 107067385 A | 8/2017 |
| CN | 107680541 A | 2/2018 |
| CN | 108446089 A | 8/2018 |
| JP | 2017079383 A | 4/2017 |

OTHER PUBLICATIONS

First Chinese Office Action dated Mar. 10, 2020, for corresponding Chinese Application No. 201810241822.7.

\* cited by examiner

DISPLAY METHOD, DISPLAY DEVICE, AND DISPLAY

CROSS-REFERENCE TO RELATED APPLICATION(S)

This application is the U.S. national phase of PCT Application No. PCT/CN2019/079199 filed on Mar. 22, 2019, which claims priority to Chinese Patent Application No. 201810241822.7 filed on Mar. 22, 2018, the disclosures of which are incorporated in their entirety by reference herein.

TECHNICAL FIELD

The present disclosure relates to the field of display technology, and in particular to a display method, a display device and a display.

BACKGROUND

With the rapid development of mobile smart devices, the requirements for the screens used in mobile smart devices are also increasing. Currently, the screen is gradually changing from a Liquid Crystal Display (LCD) to an Organic Light-Emitting Diode (OLED) display. Resolution and scanning frequency are also further improved. For example, the display resolution is changed from High Definition (HD) to Full High Definition (FHD), and then to QHD (Quad High Definition); the scanning frequency is from 60 Hz to 90 Hz, and then to 120 Hz, and so on.

However, the rapid progress of display technology can not only bring a better visual experience, but also increase the overall power consumption of mobile smart devices to a certain extent, and mobile smart devices are generally limited by specific factors, such as the power supply battery and so on, leading to greatly reduced use time of mobile smart devices.

In mobile smart devices of the related art, the method of reducing the power consumption of the OLED screen is mainly to reduce the brightness of the entire image, for example, to reduce both the bright and dark parts of the image at the same time. Although the above method can reduce the power consumption of mobile smart devices, the overall decreasing in the brightness of the display will cause the display effect to deteriorate. Especially in the scenario where mobile smart devices are used in outdoor environments, the unclear displayed image will significantly degrade the user's viewing experience.

SUMMARY

In a first aspect, the present disclosure provides a display method, including:

transmitting data to be displayed to a processing unit in an RGB format after acquiring the data to be displayed;

performing contrast adjustment and brightness adjustment on the data to be displayed in the RGB format by the processing unit, and transmitting the processed data to be displayed to a conversion unit; and converting the processed data to be displayed into data in an MIPI format by the conversion unit, and displaying the data to be displayed in the MIPI format.

Optionally, the performing contrast adjustment on the data to be displayed in the RGB format includes:

performing statistical processing to obtain a grayscale data histogram of the data to be displayed; and performing an equalization processing on the grayscale data histogram.

Optionally, the performing statistical processing to obtain the grayscale data histogram of the data to be displayed includes:

performing color space conversion on the data to be displayed to convert the data in the RGB format into data in a YUV format; and extracting grayscale data from the data in the YUV format, and performing statistical processing on the grayscale data to obtain the grayscale data histogram.

Optionally, the performing brightness adjustment on the data to be displayed in the RGB format includes:

calculating an average gray level of the data to be displayed;

comparing the average gray level with a preset gray level threshold and calculating a target coefficient, wherein, when the average gray level is greater than the preset gray level threshold, the target coefficient is equal to a ratio of the preset gray level threshold to the average gray level, and when the average gray level is less than the preset grayscale threshold, the target coefficient is equal to one;

multiplying a gray level value of each pixel in the data to be displayed by the target coefficient.

Optionally, the data to be displayed includes multiple frames of display data, and the performing contrast adjustment and brightness adjustment on the data to be displayed in the RGB format by the processing unit includes:

performing statistical processing to obtain a histogram in relation to grayscale data of a first frame of display data, and performing an equalization processing on the histogram;

mapping the histogram corresponding to the first frame of display data to a second frame of display data;

calculating an average gray level of the second frame of display data according to the histogram corresponding to the first frame of display data and the grayscale data of the second frame of display data;

if the average gray level of the second frame of display data is greater than a preset gray level threshold, reducing the average gray level of the second frame of display data, and outputting the second frame of display data with the reduced average gray level to the conversion unit;

if the average gray level of the second frame of display data is less than or equal to the preset gray level threshold, outputting the second frame of display data to the conversion unit.

Optionally, the reducing the average gray level of the second frame of display data, and outputting the second frame of display data with the reduced average gray level to the conversion unit includes:

multiplying a gray level value of each pixel in the second frame of display data by a target coefficient, the target coefficient being equal to a ratio of the preset gray level threshold to the average gray level.

Optionally, the performing statistical processing to obtain a histogram in relation to grayscale data of a first frame of display data, and performing an equalization processing on the histogram includes:

performing color space conversion on the first frame of display data to convert the data in the RGB format into data in a YUV format;

extracting grayscale data from the first frame of display data in the YUV format, and performing statistical processing on the grayscale data to obtain the histogram;

performing an equalization processing on the first frame of display data according to the histogram; and performing an optimization processing on the first frame of display data according to the average grayscale of the equalized first frame of display data.

Optionally, the reducing the average gray level of the second frame of display data includes:

calculating a target coefficient by dividing the preset gray level threshold by the average gray level; and calculating a product of the average gray level of the second frame of display data and the target coefficient.

Optionally, the performing contrast adjustment and brightness adjustment on the data to be displayed in the RGB format by the processing unit further includes:

backing up the second frame of display data, performing statistical processing to obtain a histogram in relation to grayscale data in the backed-up second frame of display data, and performing an equalization processing on the histogram;

mapping the histogram corresponding to the backed-up second frame of display data to a third frame of display data;

calculating an average gray level of the third frame of display data according to the histogram corresponding to the backed-up second frame of display data and the grayscale data of the backed-up second frame of display data;

if the average gray level of the third frame of display data is greater than the preset gray level threshold, reducing the average gray level of the third frame of display data, and outputting the third frame of display data with the reduced average gray level to the conversion unit;

if the average gray level of the third frame of display data is less than or equal to the preset gray level threshold, outputting the third frame of display data to the conversion unit.

Optionally, before performing contrast adjustment and brightness adjustment on the data to be displayed in the RGB format by the processing unit, the method further includes:

sending a test instruction to the conversion unit to determine whether the conversion unit is able to perform data conversion correctly.

In a second aspect, the present disclosure further provides a display device including:

a first transmission unit for transmitting data to be displayed to a processing unit in an RGB format after acquiring the data to be displayed;

the processing unit for performing contrast adjustment and brightness adjustment on the data to be displayed in the RGB format that is transmitted by the first transmission unit;

a second transmission unit for transmitting the data to be displayed that is processed by the processing unit to a conversion unit; and the conversion unit for converting the processed data to be displayed into data in an MIPI format that is transmitted by the second transmission unit.

Optionally, the processing unit includes:

a first processing module for performing statistical processing to obtain a histogram in relation to grayscale data of a first frame of display data, and performing an equalization processing on the histogram, wherein the data to be displayed includes multiple frames of display data;

a first mapping module for mapping the histogram corresponding to the first frame of display data to a second frame of display data;

a first calculating module for calculating an average gray level of the second frame of display data according to the histogram corresponding to the first frame of display data and the grayscale data of the second frame of display data;

a first reduction module for, when the average gray level of the second frame of display data is greater than a preset gray level threshold, reducing the average gray level of the second frame of display data;

a first output module for outputting the second frame of display data with the average gray level reduced by the first reduction module; and a second output module for, when the average gray level of the second frame of display data is less than or equal to the preset gray level threshold, outputting the second frame of display data as it is.

Optionally, the first processing module includes:

a conversion sub-module for performing color space conversion on the first frame of display data to convert the data in the RGB format into data in a YUV format;

an extraction sub-module for extracting grayscale data from the first frame of display data in the YUV format;

a statistical processing sub-module for performing statistical processing on the grayscale data to obtain the histogram;

a first processing sub-module for performing an equalization processing on the first frame of display data according to the histogram; and a second processing sub-module for performing an optimization processing on the first frame of display data according to the average grayscale of the equalized first frame of display data.

Optionally, the first reduction module includes:

a first calculation sub-module for calculating a target coefficient by dividing the preset gray level threshold by the average gray level; and a second calculation sub-module for calculating a product of the average gray level of the second frame of display data and the target coefficient.

Optionally, the processing unit further includes:

a backing-up module for backing up the second frame of display data;

a second processing module for performing statistical processing to obtain a histogram in relation to grayscale data of the backed-up second frame of display data, and performing an equalization processing on the histogram;

a second mapping module for mapping the histogram corresponding to the backed-up second frame of display data to a third frame of display data;

a second calculating module for calculating an average gray level of the third frame of display data according to the histogram corresponding to the backed-up second frame of display data and the grayscale data of the backed-up second frame of display data;

a second reduction module for, when the average gray level of the third frame of display data is greater than a preset gray level threshold, reducing the average gray level of the third frame of display data;

a third output module for outputting the third frame of display data with the reduced average gray level; and a fourth output module for, when the average gray level of the third frame of display data is less than or equal to the preset gray level threshold, outputting the third frame of display data as it is.

Optionally, the display device further includes:

a sending unit for sending a test instruction to the conversion unit to determine whether the conversion unit is able to perform data conversion correctly, before the processing unit performs contrast adjustment and brightness adjustment on the data to be displayed in the RGB format.

In a third aspect, the present disclosure further provides a display including the display device according to any of the items in the above second aspect.

In a fourth aspect, the present disclosure further provides a storage medium including a computer program stored thereon, wherein, when the computer program is running, it controls a device on which the storage medium is located to implement the display method according to any of the items in the above first aspect.

In a fifth aspect, the present disclosure further provides a processor for running a program, wherein, when the program is running, it implements the display method according to any of the items in the above first aspect.

BRIEF DESCRIPTION OF THE DRAWINGS

Various other advantages and benefits will become apparent to those of ordinary skill in the art upon reading the detailed description of the preferred embodiments below. The drawings are only for the purpose of illustrating preferred embodiments and are not to be considered as limiting the present disclosure. Moreover, like reference numerals are used throughout the drawings to refer to like parts. In the drawings.

DETAILED DESCRIPTION

The exemplary embodiments of the present disclosure will be described hereinafter in more details with reference to the drawings. It should be understood that, although the exemplary embodiments of the present disclosure are shown in the drawings, the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

In the related art, after reading the data to be displayed (image or video), the mobile smart device system directly transmits the data to be displayed to the display panel in MIPI format for display. The sensor in the system can darken the overall image according to the current environment to save the power consumption of the battery, but this way of presenting the data to be displayed tends to cause unclear image and poor display effect, and especially in scenarios where the mobile smart device is used in outdoor environments, a dim displayed image will significantly degrade the user's viewing experience.

The present disclosure provides a display method, a display device and a display for solving the problem of unclear image and poor display effect caused by the overall decrease in the brightness of the display in the related art.

Figure 1:
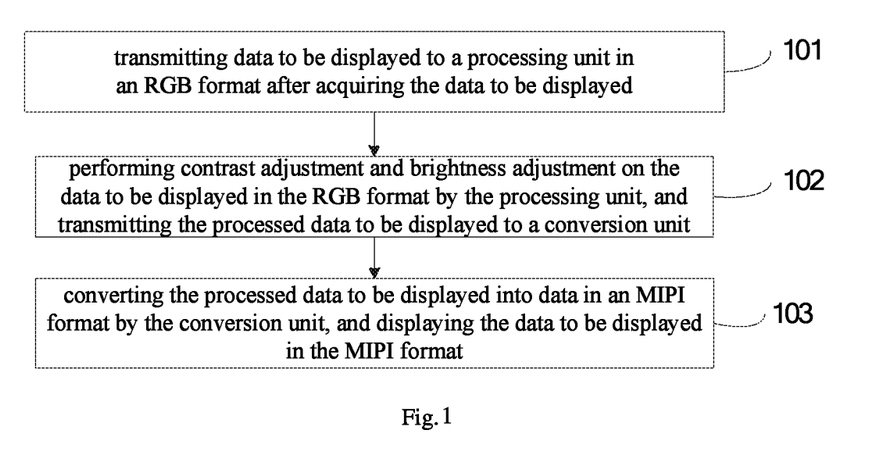
FIG. 1 shows a flowchart of a data display method according to an embodiment of the present disclosure.

In order to solve the above problem, an embodiment of the present disclosure provides a display method. As shown in FIG. 1, the method includes:

101, transmitting data to be displayed to a processing unit in an RGB format after acquiring the data to be displayed.

Figure 2:
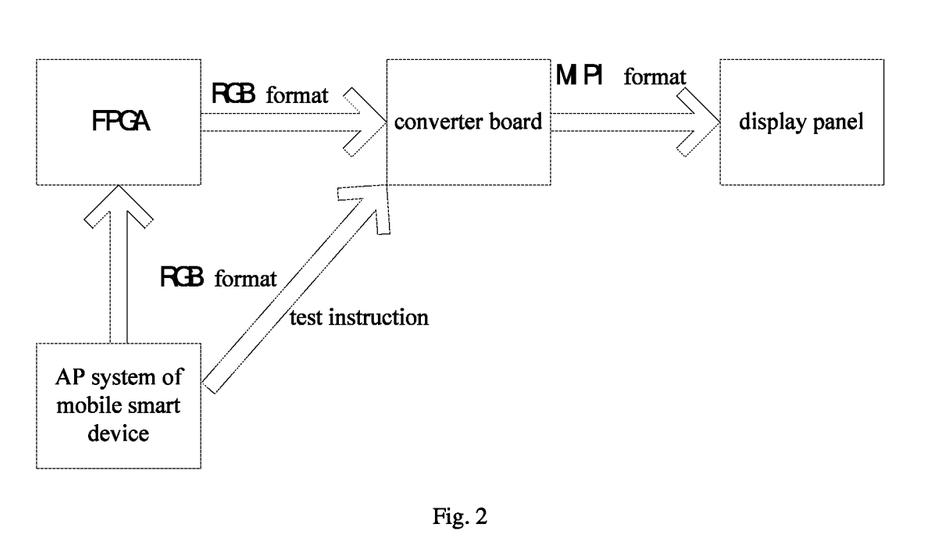
FIG. 2 shows a schematic diagram of a data display system according to an embodiment of the present disclosure.

According to some embodiments of the present disclosure, as shown in FIG. 2, a display system in the present disclosure includes: an AP system of a mobile smart device, a Field-Programmable Gate Array (FPGA), and a converter board, wherein the FPGA constitutes an implementation of the processing unit in the present disclosure and is for processing the data to be displayed, and the converter board constitutes an implementation of the conversion unit in the present disclosure and is for converting data in different formats.

After the AP system of the mobile smart device reads the pictures or videos (the data to be displayed) preset in a memory card, the data to be displayed is transmitted to the processing unit (the FPGA shown in FIG. 2) in the RGB format. The specific type of data to be displayed is not limited in the embodiments of the present disclosure.

It should be noted that, in the embodiments of the present disclosure, the purpose of transmitting the data to be displayed in the RGB format is to facilitate the subsequent extraction of the grayscale luminance of the data to be displayed.

102, performing contrast adjustment and brightness adjustment on the data to be displayed in the RGB format by the processing unit, and transmitting the processed data to be displayed to the conversion unit.

After receiving the data to be displayed in the RGB format, the processing unit performs contrast adjustment on it. According to some embodiments of the present disclosure, the aforementioned "contrast adjustment" includes, but is not limited to, histogram statistical processing, equalization processing, contrast stretching, etc. These contrast adjustment processes are used to extract the grayscale data in the data to be displayed, and adjust the data to be displayed according to the grayscale data, so that the displayed image has various shades of gray and the details are more legible, thereby enhancing the overall contrast of the data to be displayed and improving the image resolution when presenting the data to be displayed. Exemplary implementations of the contrast adjustment that can be used is described below, and any appropriate means for contrast adjustment can be adopted in the technical solutions of the present disclosure. These technical means conform to the purpose and spirit of the present disclosure, and are therefore covered by the protective scope of the technical solutions of the present disclosure.

According to some embodiments of the present disclosure, the above-mentioned statistics for contrast adjustment include a grayscale histogram of each frame of display data in multiple frames of data to be displayed, and the grayscale histogram is equalized. The equalization processing here refers to a processing in which the grayscale histogram of the original image is transformed from a state of relatively concentrating in a certain grayscale interval to a state of uniformly distributing in the entire grayscale range. After the equalization processing, the displayed image may have various shades of gray and the details are more legible, thereby facilitating providing users with a better viewing experience. In some embodiments, the equalization processing applies a piecewise linear transformation function to transform the grayscale histogram of the image, in order to improve the dynamic range of the image in the gray level domain; for example, for 8-bit pixel data, the grayscale histogram is relatively uniformly distributed at each gray value in [0-255] by the equalization process.

In order to further reduce the power consumption of the battery, the grayscale value of the entire image is determined after the above contrast adjustment processing is completed. If the grayscale value is greater than a preset grayscale value, it means that the luminance for the display data is too high, and thus the display luminance for the entire data to be displayed may be reduced automatically, thereby the purpose of reducing the power consumption is achieved.

According to some embodiments of the present disclosure, the luminance (gray level value) of the entire image is adjusted after the above contrast adjustment processing is completed, so that the entire luminance of the displayed image is ensured to not exceed a preset level. In other words, since the power consumption of a mobile device when displaying is highly relative to the luminance (average gray level) of the displayed image, the power consumption for display of the mobile device can be maintained within an acceptable range by limiting the average gray level of the displayed image after being adjusted in a preset gray level threshold.

According to some embodiments of the present disclosure, the above-mentioned "preset gray level threshold" may be either a static threshold corresponding to the power consumption limitation of the mobile device or a dynamic threshold which may be changed with operating status, remaining power, or energy saving mode. Depending on different application scenarios, the power consumption of the mobile device may be converted into a preset gray level threshold by any applicable algorithm. By adaptively adjusting the gray value of the displayed image by using the preset gray level threshold, the display luminance for the data to be displayed can be maintained within an appropriate range, thereby achieving optimized energy consumption control.

103, converting the processed data to be displayed into data in an MIPI format by the conversion unit, and displaying the data to be displayed in the MIPI format.

The display panel according to the embodiment of the present disclosure may be an OLED screen. In the related art, the OLED screen is suitable for displaying data in the MIPI format. Therefore, the data in the RGB format processed in step 102 needs to be converted into data in the MIPI format in order to display the data in the MIPI format corresponding to the data to be displayed.

The technical solutions provided by the present disclosure have at least the following advantages:

The display method, the device and the display provided by the present disclosure, after acquiring the data to be displayed, transmit the data to be displayed to the processing unit in the RGB format; the data in the RGB format is processed by the processing unit and the processed data in the RGB format is transmitted to the conversion unit; the processed data in the RGB format is converted into the data in the MIPI format by the conversion unit in order to display the data in the MIPI format corresponding to the data to be displayed; compared with the related art, the present disclosure performs the intermediate conversion processing through the processing unit, enhancing the contrast of the data to be displayed, causing the image for the data to be displayed to have various shades of gray, and causing the details more legible, thereby obtaining enhanced display quality while reducing the power consumption of the mobile device.

Figure 3:
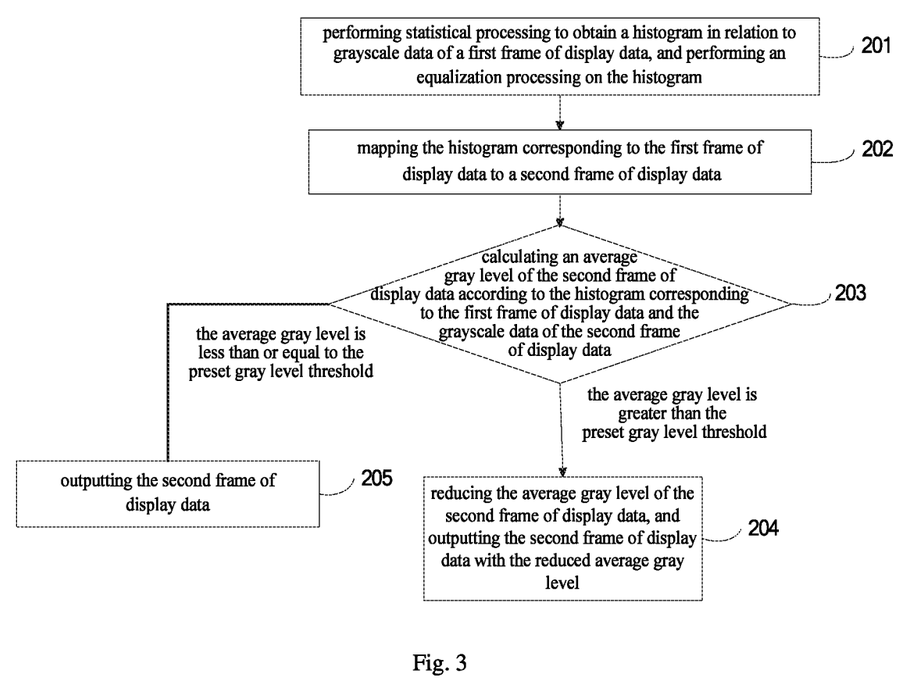
FIG. 3 shows a flowchart of another data display method according to an embodiment of the present disclosure.

As a refinement of the above step 102, as shown in FIG. 3, an embodiment of the present disclosure further provides a method for processing the data to be displayed in RGB format, where the data to be displayed includes multiple frames of display data, and the method includes:

201, performing statistical processing to obtain a histogram in relation to grayscale data of a first frame of display data, and performing an equalization processing on the histogram.

In order to facilitate the extraction of grayscale data, in the specific implementation processing of the embodiment of the present disclosure, color space conversion is performed first, that is, the first frame of display data is subjected to color space conversion so that the data in the RGB format is converted into the data in the YUV format. It should be noted that in the embodiment of the present disclosure, when processing the data in the YUV format, only Y data is processed, and U and V data are not processed. In the embodiment of the present disclosure, one piece of data to be displayed is composed of multiple frames of display data.

The purpose of performing the space conversion is to extract the grayscale data of the first frame of display data. After extracting the grayscale data from the first frame of display data in the YUV format, a statistical processing is performed on the grayscale data to obtain a histogram; In the histogram, the horizontal coordinate is the gray value of 0-255, and the vertical coordinate is the number of different gray values in the first frame of display data. The processing of the histogram statistics in the embodiment of the present disclosure can also be performed using any other appropriate technical means, which will not be limited in the present disclosure.

After a histogram corresponding to the first frame of display data is determined, the first frame of display data needs to be equalized according to the histogram.

After the equalization processing is performed on the first frame of display data, the average grayscale of the equalized first frame of display data is calculated, and the first frame of display data is optimized according to the average grayscale.

202, mapping the histogram corresponding to the first frame of display data to a second frame of display data.

In a practical application, in the multiple frames of display data included in the same data to be displayed, the difference between the images of adjacent frames are small. Therefore, after obtaining the histogram at step 201, the histogram may be mapped to the second frame image.

The histogram corresponding to the first frame of display data is stored in the form of LUT, and the histogram is applied to the second frame of display data; in addition, after the mapping is completed, the data of the edges may be processed to filter out clutter and reduce interference.

203, calculating an average gray level of the second frame of display data according to the histogram corresponding to the first frame of display data and the grayscale data of the second frame of display data.

If the average gray level of the second frame of display data is greater than the preset gray level threshold, step 204 will be performed; on the other hand, if the average gray level of the second frame of display data is less than or equal to the preset gray level threshold, step 205 will be performed.

204, reducing the average gray level of the second frame of display data, and outputting the second frame of display data with the reduced average gray level.

The purpose of reducing the gray level is to further save the power consumption of the device.

A target coefficient is calculated by dividing the preset gray level threshold by the average gray level; and a product of the average gray level of the second frame of display data and the target coefficient is calculated. Assumed that the average gray level value is Gray, the gray level value corresponding to the preset gray level threshold is Gray_R, and the target coefficient is Gray_R/Gray. The second frame of display data needs to be multiplied by the target coefficient Gray_R/Gray to achieve the reduction of the gray level value, that is, the overall luminance of the second frame of display data is reduced to achieve adaptive adjustment.

205, outputting the second frame of display data as it is.

Figure 4:
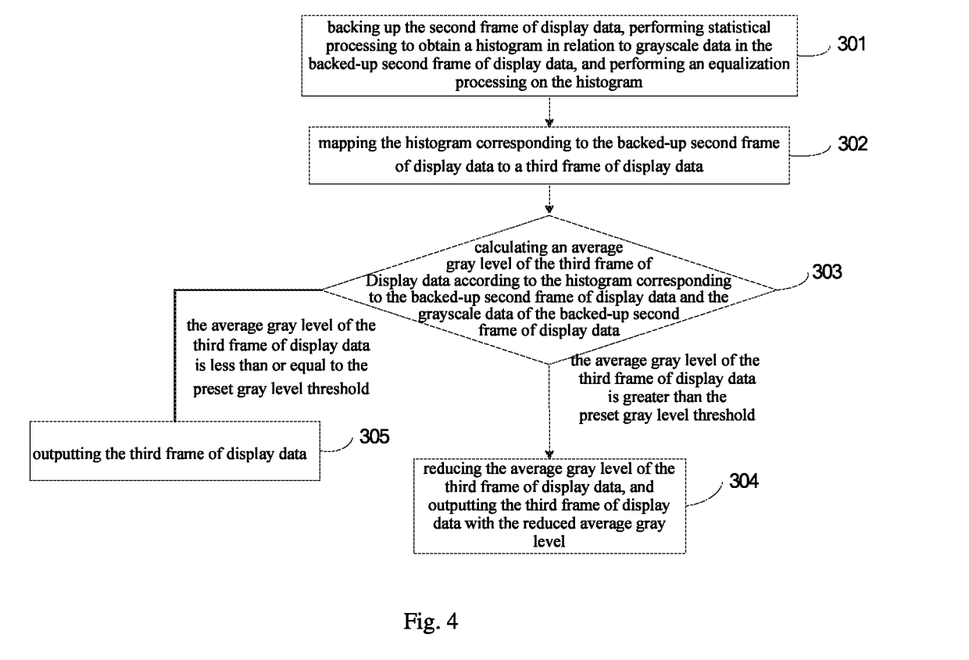
FIG. 4 shows a flowchart of another data display method according to an embodiment of the present disclosure.
Figure 5:
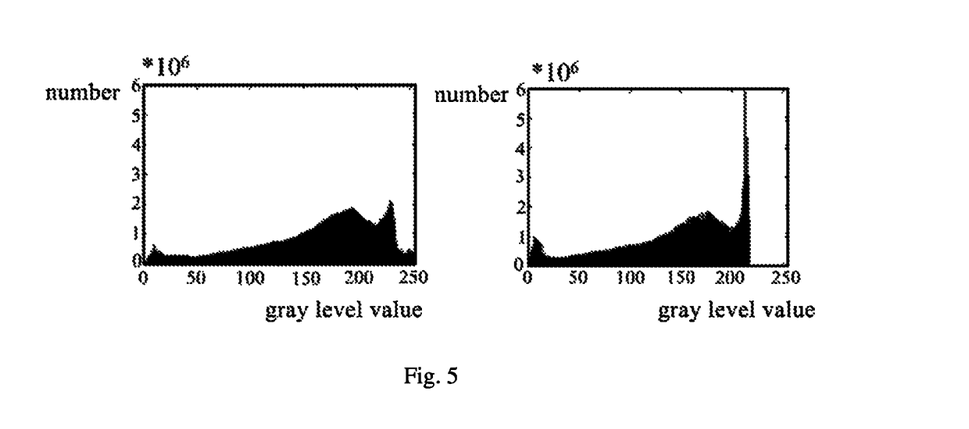
FIG. 5 shows a schematic diagram of a comparison effect of grayscale histograms of data to be displayed.

The method shown in FIG. 3 includes applying the histogram of the first frame of display data to the second frame of display data. In a practical application, the image to be displayed may include three frames of data therein, and after the histogram of the first display data is mapped to the second frame of display data, the histogram of the second frame of display data needs to be mapped to the third frame of display data. As shown in FIG. 4, the method includes:

301, backing up the second frame of display data, performing statistical processing to obtain a histogram in relation to grayscale data in the backed-up second frame of display data, and performing an equalization processing on the histogram.

In a specific implementation, the methods as shown in FIGS. 3 and 4 may be performed either in parallel or in sequence, and the performing sequence is not limited in the embodiment of the present disclosure.

302, mapping the histogram corresponding to the backed-up second frame of display data to a third frame of display data.

303, calculating an average gray level of the third frame of display data according to the histogram corresponding to the backed-up second frame of display data and the grayscale data of the backed-up second frame of display data.

If the average gray level of the third frame of display data is greater than the preset gray level threshold, step 304 will be performed; on the other hand, if the average gray level of the third frame of display data is less than or equal to the preset gray level threshold, step 305 will be performed.

304, reducing the average gray level of the third frame of display data, and outputting the third frame of display data with the reduced average gray level;

305, outputting the third frame of display data as it is.

It should be noted that, the descriptions related to steps 301 to 305 may refer to the detailed description for the method shown in FIG. 3, and will not be repeated here in the embodiment of this present disclosure.

In a practical application, the methods in FIGS. 3 and 4 are performed in a cyclic manner for the data to be displayed until all frames of data included in the data to be displayed is processed.

In a practical application, before the processing unit processes the data in the RGB format, a test instruction is sent to the conversion unit (as shown in FIG. 2) to determine whether the conversion unit is capable of performing the data conversion correctly.

Further, as an implementation of the above method shown in FIG. 1, another embodiment of the present disclosure further provides a display device. The device embodiment corresponds to the foregoing method embodiment. For ease of reading, this device embodiment will not repeat the details in the foregoing method embodiment, but it should be clear that the device in this embodiment can correspondingly implement all the contents in the foregoing method embodiment.

Figure 6:
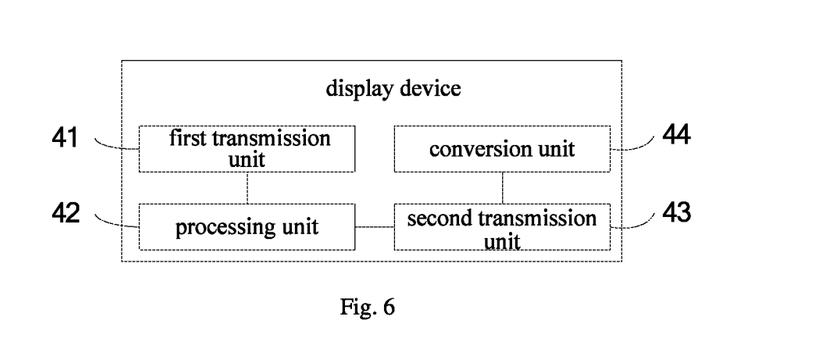
FIG. 6 shows a block diagram of a configuration of a data display device according to an embodiment of the present disclosure.

An embodiment of the present disclosure provides a display device, as shown in FIG. 6, including:

a first transmission unit 41 for transmitting data to be displayed to a processing unit in an RGB format after acquiring the data to be displayed;

a processing unit 42 for processing the data in the RGB format that is transmitted by the first transmission unit;

a second transmission unit 43 for transmitting the data in the RGB format that is processed by the processing unit 42 to a conversion unit 44; and the conversion unit 44 for converting the processed data in the RGB format into data in an MIPI format that is transmitted by the second transmission unit, so as to display the data in the MIPI format corresponding to the data to be displayed.

Figure 7:
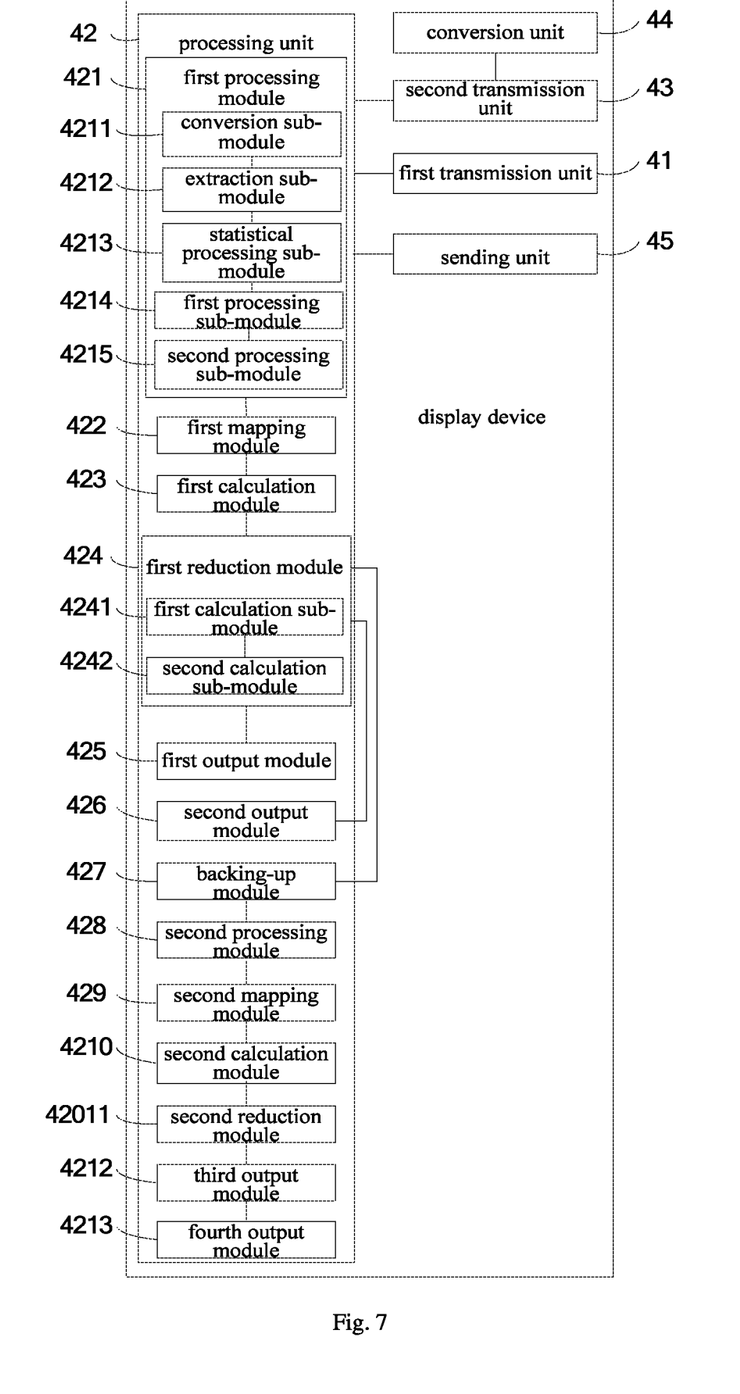
FIG. 7 shows a block diagram of a configuration of another data display device according to an embodiment of the present disclosure.

Further, as shown in FIG. 7, the processing unit 42 includes:

a first processing module 421 for performing statistical processing to obtain a histogram in relation to grayscale data of a first frame of display data, and performing an equalization processing on the histogram, wherein the data to be displayed includes multiple frames of display data;

a first mapping module 422 for mapping the histogram corresponding to the first frame of display data to a second frame of display data;

a first calculating module 423 for calculating an average gray level of the second frame of display data according to the histogram corresponding to the first frame of display data and the gray data of the second frame of display data;

a first reduction module 424 for, when the average gray level of the second frame of display data is greater than a preset gray level threshold, reducing the average gray level of the second frame of display data;

a first output module 425 for outputting the second frame of display data with the average gray level reduced by the first reduction module; and a second output module 426 for, when the average gray level of the second frame of display data is less than or equal to the preset gray level threshold, outputting the second frame of display data as it is.

Further, as shown in FIG. 7, the first processing module 421 includes:

a conversion sub-module 4211 for performing color space conversion on the first frame of display data to convert the data in the RGB format into data in a YUV format;

an extraction sub-module 4212 for extracting grayscale data from the first frame of display data in the YUV format;

a statistical processing sub-module 4213 for performing statistical processing on the grayscale data to obtain the histogram;

a first processing sub-module 4214 for performing an equalization processing on the first frame of display data according to the histogram; and a second processing sub-module 4215 for performing an optimization processing on the first frame of display data according to the average grayscale of the equalized first frame of display data.

Further, as shown in FIG. 7, the first reduction module 424 includes:

a first calculation sub-module 4241 for calculating a target coefficient by dividing the preset gray level threshold by the average gray level; and a second calculation sub-module 4242 for calculating a product of the average gray level of the second frame of display data and the target coefficient.

Further, as shown in FIG. 7, the processing unit 42 further includes:

a backing-up module 427 for backing up the second frame of display data;

a second processing module 428 for performing statistical processing to obtain a histogram in relation to grayscale data of the backed-up second frame of display data, and performing an equalization processing on the histogram;

a second mapping module 429 for mapping the histogram corresponding to the backed-up second frame of display data to a third frame of display data;

a second calculating module 4210 for calculating an average gray level of the third frame of display data according to the histogram corresponding to the backed-up second frame of display data and the gray data of the backed-up second frame of display data;

a second reduction module 42011 for, when the average gray level of the third frame of display data is greater than a preset gray level threshold, reducing the average gray level of the third frame of display data;

a third output module 4212 for outputting the third frame of display data with the reduced average gray level; and a fourth output module 4213 for, when the average gray level of the third frame of display data is less than or equal to the preset gray level threshold, outputting the third frame of display data as it is.

Further, as shown in FIG. 7, the device further includes:

a sending unit 45 for, before the processing unit 42 processes the data in the RGB format, sending a test instruction to the conversion unit to determine whether the conversion unit is able to perform data conversion correctly.

An embodiment of the present disclosure further provides a display which includes the display device in FIG. 6 or 7.

The display device and the display according to the embodiments of the present disclosure transmit the data to be displayed to the processing unit in the RGB format after acquiring the data to be displayed; the data in the RGB format is processed by the processing unit, and the processed data in the RGB format is transmitted to the conversion unit; the processed data in the RGB format is converted by the conversion unit into the data in the MIPI format so as to display the data in the MIPI format corresponding to the data to be displayed; compared with the related art, the embodiments of the present disclosure, by the intermediate conversion processing through the processing unit, enhance the contrast of the data to be displayed, causes the image for the data to be displayed to have various shades of gray, and cause the details more legible, thereby obtaining enhanced display quality while reducing the power consumption of the mobile device.

The display device includes a processor and a storage, and the above first transmission unit, the processing unit, the second transmission unit, the conversion unit, etc., are stored in the storage as program units. Respective functions are implemented by executing the above program units stored in the storage by the processor.

The processor contains a core therein for fetching respective program units from the storage. There may be one or more cores, and the problem of dim image and poor display effect due to the overall decreasing in the luminance of the display in the related art can be solved by adjusting the core parameters.

The storage may include non-persistent memory, random access memory (RAM), and/or non-volatile memory in the computer-readable medium, such as read-only memory (ROM) or flash memory (flash RAM). The storage includes at least one memory chip.

An embodiment of the present disclosure provides a storage medium with a program stored thereon which, when executed by a processor, implements the above display method.

An embodiment of the present disclosure provides a processor for running a program which, when running, implements the above display method.

An embodiment of the present disclosure provides a device including a processor, a storage and a program stored on the storage and capable of running on the processor, when the processor executes the program, the following steps are performed:

transmitting data to be displayed to a processing unit in an RGB format after acquiring the data to be displayed;

processing the data in the RGB format by the processing unit, and transmitting the processed data in the RGB format to a conversion unit;

converting the processed data in the RGB format into data in an MIPI format by the conversion unit, so as to display the data in the MIPI format corresponding to the data to be displayed.

Optionally, the processing the data in the RGB format by the processing unit includes:

performing statistical processing to obtain a histogram in relation to grayscale data of a first frame of display data, and performing an equalization processing on the histogram, wherein the data to be displayed includes multiple frames of display data;

mapping the histogram corresponding to the first frame of display data to a second frame of display data;

calculating an average gray level of the second frame of display data according to the histogram corresponding to the first frame of display data and the gray data of the second frame of display data;

if the average gray level of the second frame of display data is greater than a preset gray level threshold, reducing the average gray level of the second frame of display data, and outputting the second frame of display data with the reduced average gray level;

if the average gray level of the second frame of display data is less than or equal to the preset gray level threshold, outputting the second frame of display data as it is.

Optionally, the performing statistical processing to obtain a histogram in relation to grayscale data of a first frame of display data, and performing an equalization processing on the histogram includes:

performing color space conversion on the first frame of display data to convert the data in the RGB format into data in a YUV format;

extracting grayscale data from the first frame of display data in the YUV format, and performing statistical processing on the grayscale data to obtain the histogram;

performing an equalization processing on the first frame of display data according to the histogram;

performing an optimization processing on the first frame of display data according to the average grayscale of the equalized first frame of display data.

Optionally, the reducing the average gray level of the second frame of display data includes:

calculating a target coefficient by dividing the preset gray level threshold by the average gray level;

calculating a product of the average gray level of the second frame of display data and the target coefficient.

Optionally, the processing the data in the RGB format by the processing unit further includes:

backing up the second frame of display data, and performing statistical processing to obtain a histogram in relation to grayscale data of the backed-up second frame of display data, and performing an equalization processing on the histogram;

mapping the histogram corresponding to the backed-up second frame of display data to a third frame of display data;

calculating an average gray level of the third frame of display data according to the histogram corresponding to the backed-up second frame of display data and the gray data of the backed-up second frame of display data;

if the average gray level of the third frame of display data is greater than a preset gray level threshold, reducing the average gray level of the third frame of display data, and outputting the third frame of display data with the reduced average gray level; and if the average gray level of the third frame of display data is less than or equal to the preset gray level threshold, outputting the third frame of display data as it is.

Optionally, before the processing unit processing the data to be displayed in the RGB format by the processing unit, the method further includes:

sending a test instruction to the conversion unit to determine whether the conversion unit is able to perform data conversion correctly.

The device herein can be a display in any smart device.

This application also provides a computer program product, which when executed on a data processing device, is suitable for executing program code initialized with the following method steps: transmitting data to be displayed to a processing unit in an RGB format after acquiring the data to be displayed;

processing the data in the RGB format by the processing unit, and transmitting the processed data in the RGB format to a conversion unit;

converting the processed data in the RGB format into data in an MIPI format by the conversion unit, so as to display the data in the MIPI format corresponding to the data to be displayed.

Those skilled in the art should understand that the embodiments of the present application may be provided as a method, a system, or a computer program product. Therefore, this application may take the form of an entirely hardware embodiment, an entirely software embodiment, or an embodiment combining software and hardware aspects. Moreover, this application may take the form of a computer program product implemented on one or more computer-usable storage media (including but not limited to disk storage, CD-ROM, optical storage, etc.) containing computer-usable program code therein.

This application is described with reference to flowcharts and/or block diagrams of methods, devices (systems), and computer program products according to embodiments of the present application. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, a dedicated computer, an embedded processor, or other programmable data processing device to produce a machine, so that the instructions executed by the processor of the computer or other programmable data processing device can generate means for implementing the functions specified in one or more processes of the flowcharts and/or one or more blocks of the block diagrams.

These computer program instructions may also be stored in a computer-readable storage capable of directing a computer or other programmable data processing device to work in a particular manner such that the instructions stored in the computer-readable storage produce a manufactured article including an instruction device which implements the functions specified in one or more processes of the flowcharts and/or one or more blocks of the block diagram.

These computer program instructions can also be loaded on a computer or other programmable data processing device, so that a series of steps can be performed on the computer or other programmable device to produce a computer-implemented processing, thereby the instructions executed on the computer or other programmable device provide steps for implementing the functions specified in one or more processes of the flowcharts and/or one or more blocks of the block diagrams.

In a typical configuration, a computing device includes one or more processors (CPUs), input/output interfaces, network interfaces, and memory.

The storage may include non-persistent memory, random access memory (RAM), and/or non-volatile memory in the computer-readable media, such as read-only memory (ROM) or flash memory (flash RAM). The storage is an example of a computer-readable medium.

Computer-readable media includes both permanent and non-persistent, removable and non-removable media, and information storing can be accomplished by any method or technology. The information may be computer-readable instructions, data structures, modules of a program, or other data. Examples of computer storage media include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic tape cartridges, magnetic tape magnetic disk storage or other magnetic storage devices or any other non-transmission media, which may be used to store information that can be accessed by computing devices. As defined herein, the computer-readable media does not include transitory media, such as modulated data signals and carrier waves.

It should also be noted that the terms "comprise", "include" or any other variation thereof are intended to encompass non-exclusive inclusion, so that a process, method, product, or device that includes a range of elements includes not only those elements, but also other elements not explicitly listed, or those that are inherent to such a process, method, product, or device. Without more restrictions, the element defined by the sentence "comprising a . . . " do not exclude the existence of other identical elements in the process, method, product or equipment including the element.

Those skilled in the art should understand that the embodiments of the present application may be provided as a method, a system, or a computer program product. Therefore, this application may take the form of an entirely hardware embodiment, an entirely software embodiment, or an embodiment combining software and hardware aspects. Moreover, this application may take the form of a computer program product implemented on one or more computer-usable storage media (including but not limited to disk storage, CD-ROM, optical storage, etc.) containing computer-usable program code therein.

The above are merely the embodiments of the present application, and are not intended to limit the present application. Those skilled in the art may make various modifications and variations. Any modification, equivalent replacement, and improvement made within the spirit and principle of this application shall be included in the scope of claims of this application.

What is claimed is:

1. A display method, comprising:
   transmitting data to be displayed to a processing unit in an RGB format after acquiring the data to be displayed;
   performing contrast adjustment and brightness adjustment on the data to be displayed in the RGB format by the processing unit to obtain processed data to be displayed, and transmitting the processed data to be displayed to a conversion unit; and
   converting the processed data to be displayed into data in an MIPI format by the conversion unit to obtain converted data to be displayed, and displaying the converted data to be displayed in the MIPI format;
   wherein the performing contrast adjustment on the data to be displayed in the RGB format comprises:
      performing statistical processing to obtain a grayscale data histogram of the data to be displayed; and
      performing an equalization processing on the grayscale data histogram;
   wherein the performing brightness adjustment on the data to be displayed in the RGB format comprises:
      calculating an average gray level of the data to be displayed;
      comparing the average gray level with a preset gray level threshold and calculating a target coefficient, wherein, when the average gray level is greater than the preset gray level threshold, the target coefficient is equal to a ratio of the preset gray level threshold to the average gray level, and when the average gray level is less than the preset grayscale threshold, the target coefficient is equal to one; and
      multiplying a gray level value of each pixel in the data to be displayed by the target coefficient.

2. The method according to claim 1, wherein the performing statistical processing to obtain the grayscale data histogram of the data to be displayed comprises:
   performing color space conversion on the data to be displayed to convert the data in the RGB format into data in a YUV format; and
   extracting grayscale data from the data in the YUV format, and performing statistical processing on the grayscale data to obtain the grayscale data histogram.

3. The method according to claim 1, wherein the data to be displayed comprises multiple frames of display data, and the performing contrast adjustment and brightness adjustment on the data to be displayed in the RGB format by the processing unit comprises:
   performing statistical processing to obtain a histogram in relation to grayscale data of a first frame of display data, and performing an equalization processing on the histogram;
   mapping the histogram corresponding to the first frame of display data to a second frame of display data;
   calculating an average gray level of the second frame of display data according to the histogram corresponding to the first frame of display data and the grayscale data of the second frame of display data;
   if the average gray level of the second frame of display data is greater than a preset gray level threshold, reducing the average gray level of the second frame of display data, and outputting the second frame of display data with the reduced average gray level to the conversion unit; and
   if the average gray level of the second frame of display data is less than or equal to the preset gray level threshold, outputting the second frame of display data to the conversion unit.

4. The method according to claim 3, wherein the reducing the average gray level of the second frame of display data, and outputting the second frame of display data with the reduced average gray level to the conversion unit comprises:
   multiplying a gray level value of each pixel in the second frame of display data by a target coefficient, the target coefficient being equal to a ratio of the preset gray level threshold to the average gray level.

5. The method according to claim 4, wherein the performing contrast adjustment and brightness adjustment on the data to be displayed in the RGB format by the processing unit further comprises:
   backing up the second frame of display data, performing statistical processing to obtain a histogram in relation to grayscale data in the backed-up second frame of display data, and performing an equalization processing on the histogram;
   mapping the histogram corresponding to the backed-up second frame of display data to a third frame of display data;
   calculating an average gray level of the third frame of display data according to the histogram corresponding to the backed-up second frame of display data and the grayscale data of the backed-up second frame of display data;
   if the average gray level of the third frame of display data is greater than the preset gray level threshold, reducing the average gray level of the third frame of display data, and outputting the third frame of display data with the reduced average gray level to the conversion unit; and
   if the average gray level of the third frame of display data is less than or equal to the preset gray level threshold, outputting the third frame of display data to the conversion unit.

6. The method according to claim 3, wherein the performing contrast adjustment and brightness adjustment on the data to be displayed in the RGB format by the processing unit further comprises:
   backing up the second frame of display data, performing statistical processing to obtain a histogram in relation to grayscale data in the backed-up second frame of display data, and performing an equalization processing on the histogram;
   mapping the histogram corresponding to the backed-up second frame of display data to a third frame of display data;
   calculating an average gray level of the third frame of display data according to the histogram corresponding to the backed-up second frame of display data and the grayscale data of the backed-up second frame of display data;
   if the average gray level of the third frame of display data is greater than the preset gray level threshold, reducing the average gray level of the third frame of display data, and outputting the third frame of display data with the reduced average gray level to the conversion unit; and
   if the average gray level of the third frame of display data is less than or equal to the preset gray level threshold, outputting the third frame of display data to the conversion unit.

7. The method according to claim 6, wherein before performing contrast adjustment and brightness adjustment on the data to be displayed in the RGB format by the processing unit, further comprising the method further comprises:

sending a test instruction to the conversion unit to determine whether the conversion unit is able to perform data conversion correctly.

8. A storage medium having a computer program stored thereon, the computer program implementing, when executed by a processor, the display method according to claim 1.

9. A display device comprising a storage, a processor and a computer program stored on the storage and capable of running on the processor, the computer program implementing, when executed by the processor, a display method comprising:

transmitting data to be displayed to a processing unit in an RGB format after acquiring the data to be displayed;

performing contrast adjustment and brightness adjustment on the data to be displayed in the RGB format by the processing unit, and transmitting the processed data to be displayed to a conversion unit; and converting the processed data to be displayed into data in an MIPI format by the conversion unit, and displaying the data to be displayed in the MIPI format;

wherein the performing contrast adjustment on the data to be displayed in the RGB format comprises:

performing statistical processing to obtain a grayscale data histogram of the data to be displayed; and performing an equalization processing on the grayscale data histogram;

wherein the performing brightness adjustment on the data to be displayed in the RGB format comprises:

calculating an average gray level of the data to be displayed;

comparing the average gray level with a preset gray level threshold and calculating a target coefficient, wherein, when the average gray level is greater than the preset gray level threshold, the target coefficient is equal to a ratio of the preset gray level threshold to the average gray level, and when the average gray level is less than the preset grayscale threshold, the target coefficient is equal to one; and multiplying a gray level value of each pixel in the data to be displayed by the target coefficient.

10. The display device according to claim 9, wherein in the display method implemented by the computer program when executed by the processor, the performing statistical processing to obtain the grayscale data histogram of the data to be displayed comprises:

performing color space conversion on the data to be displayed to convert the data in the RGB format into data in a YUV format; and extracting grayscale data from the data in the YUV format, and performing statistical processing on the grayscale data to obtain the grayscale data histogram.

11. The display device according to claim 9, wherein in the display method implemented by the computer program when executed by the processor, the data to be displayed comprises multiple frames of display data, and the performing contrast adjustment and brightness adjustment on the data to be displayed in the RGB format by the processing unit comprises:

performing statistical processing to obtain a histogram in relation to grayscale data of a first frame of display data, and performing an equalization processing on the histogram;

mapping the histogram corresponding to the first frame of display data to a second frame of display data;

calculating an average gray level of the second frame of display data according to the histogram corresponding to the first frame of display data and the grayscale data of the second frame of display data;

if the average gray level of the second frame of display data is greater than a preset gray level threshold, reducing the average gray level of the second frame of display data, and outputting the second frame of display data with the reduced average gray level to the conversion unit;

if the average gray level of the second frame of display data is less than or equal to the preset gray level threshold, outputting the second frame of display data to the conversion unit.

12. The display device according to claim 11, wherein in the display method implemented by the computer program when executed by the processor, the reducing the average gray level of the second frame of display data, and outputting the second frame of display data with the reduced average gray level to the conversion unit comprises:

multiplying a gray level value of each pixel in the second frame of display data by a target coefficient, the target coefficient being equal to a ratio of the preset gray level threshold to the average gray level.

13. The display device according to claim 12, wherein in the display method implemented by the computer program when executed by the processor, the performing contrast adjustment and brightness adjustment on the data to be displayed in the RGB format by the processing unit further comprises:

backing up the second frame of display data, performing statistical processing to obtain a histogram in relation to grayscale data in the backed-up second frame of display data, and performing an equalization processing on the histogram;

mapping the histogram corresponding to the backed-up second frame of display data to a third frame of display data;

calculating an average gray level of the third frame of display data according to the histogram corresponding to the backed-up second frame of display data and the grayscale data of the backed-up second frame of display data;

if the average gray level of the third frame of display data is greater than the preset gray level threshold, reducing the average gray level of the third frame of display data, and outputting the third frame of display data with the reduced average gray level to the conversion unit;

if the average gray level of the third frame of display data is less than or equal to the preset gray level threshold, outputting the third frame of display data to the conversion unit.

14. The display device according to claim 13, in the display method implemented by the computer program when executed by the processor, before performing contrast adjustment and brightness adjustment on the data to be displayed in the RGB format by the processing unit, the method further comprises:

sending a test instruction to the conversion unit to determine whether the conversion unit is able to perform data conversion correctly.

15. A display comprising the display device according to claim 9.

* * * * *